Patented Nov. 19, 1940

2,221,818

UNITED STATES PATENT OFFICE 2,221,818

ETHERS OF ALKYL-PHENOLS

Harold R. Slagh and Francis N. Alquist, Midland, Mich., assignors to The Dow Chemical Company, Midland, Mich., a corporation of Michigan No Drawing. Application August 17, 1938, Serial No. 225,417

6 Claims. (Cl. 260—348)

This invention relates to ethers of alkyl-phenols and is particularly concerned with compounds having the formula

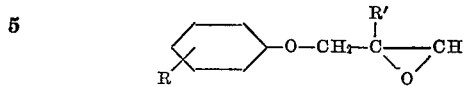

wherein R represents an alkyl radical containing between 4 and 8 carbon atoms, inclusive, and R' represents a member of the group consisting of hydrogen and the methyl radical.

The above compounds may be prepared by reacting an aqueous solution of an alkali metal salt of a suitable alkyl-phenol with 1-chloro-propylene-oxide-2,3 or 1-chloro-2-methyl-propylene-oxide-2,3. The reaction is carried out by adding the phenolate solution portion-wise and with stirring to a molecular excess of the propylene-oxide derivative at temperatures between 40° C. and the boiling temperature of the mixture. The mixture is thereafter warmed until the reaction is substantially complete, cooled, and the crude ether product separated therefrom as by extraction, decantation, filtration, etc. Upon fractional distillation of the crude product, the desired compound is obtained in substantially pure form.

The following examples describe in detail the preparation of certain individual members of our new class of compounds, but are not to be construed as limiting the invention.

Example 1

A solution consisting of 75 grams (0.5) mole of 4-tertiarybutyl-phenol, 21 grams (0.5 mole) of 95 per cent sodium hydroxide, and 150 milliliters of water was added portion-wise and with stirring to 92.5 grams (1.0 mole) of 1-chloro-propylene-oxide-2,3 in 50 minutes at temperatures gradually increasing from 60° to 70° C. The reaction mixture was then heated to 80°-90° C. for an additional 45 minutes, cooled, and the water-immiscible water layer of crude ether products separated by decantation. This mixed product was washed with water and fractionally distilled, whereby there was obtained 64 grams of 1-(4-tertiary-butyl-phenoxy)-propylene-oxide-2,3 as a colorless, mobile liquid boiling at 145°-152° C. at 0.2 inch pressure and having a specific gravity of 1.0338 at 25°/25° C.

Example 2

A slurry of 103 grams (0.5 mole) of 4-tertiary-octyl-phenol, 21 grams (0.5 mole) of 95 per cent sodium hydroxide, and 250 milliliters of water was added portion-wise and with stirring to 51 grams (0.55 mole) of 1-chloro-propylene-oxide-2,3 over a period of one hour and at temperatures increasing from 40° to 50° C. The temperature of the reaction mixture was thereafter gradually increased to 80° C. over a period of two hours, the mixture cooled, and a water-immiscible layer containing the desired ether product separated by decantation. This ether layer was washed with water and fractionally distilled, whereby there was obtained 1-(4-tertiary-octyl-phenoxy)-propylene-oxide-2,3 as a thick, viscous oil boiling at approximately 190° C. at 0.35 inch pressure and having a specific gravity of 0.996 at 25°/25° C.

By substituting 1-chloro-2-methyl-propylene-oxide-2,3 for the chloro-propylene-oxides shown in the foregoing examples, the corresponding butylene derivatives are formed. These compounds are similar in characteristic to the ethers shown above.

In a like manner, 1-chloro-propylene-oxide-2,3 and 1-chloro-2-methyl-propylene-oxide-2,3 may be reacted with other alkyl-phenols to obtain corresponding ethers of 4-normal-butyl-phenol, 4-secondary-amyl-phenol, 4-isohexyl-phenol, 2-normal-hexyl-phenol, 2-secondary-amyl-phenol, 3-tertiarybutyl-phenol, and the like. Ethers of the above phenols obtained as described in the foregoing examples are for the most part liquids, although certain of the compounds are obtained as viscous oils which tend to solidify on standing.

Petroleum distillate solutions of the above ether compounds have been found of value as fly spray materials. For example, a 3 per cent solution of 1-(4-tertiarybutyl-phenoxy)-propylene-oxide-2,3 in kerosene, when tested by the Peet-Grady method, substantially as described in Soap, 8, No. 4, 1932, was found to knock down 84 per cent of three-day old house flies contacted therewith in 10 minutes.

We claim:

1. A compound having the formula

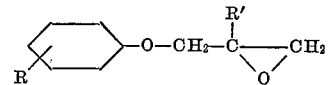

wherein R represents an unsubstituted alkyl radical containing from 4 to 8 carbon atoms, inclusive, and R' represents a member of the group consisting of hydrogen and the methyl radical.

2. A compound having the formula

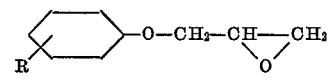

wherein R represents an unsubstituted alkyl group containing from 4 to 8 carbon atoms, inclusive.

3. A compound having the formula

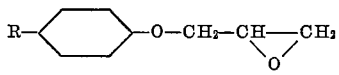

wherein R represents an unsubstituted alkyl group containing from 4 to 8 carbon atoms, inclusive.

4. A compound having the formula

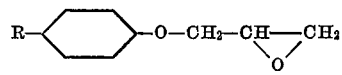

wherein R represents an unsubstituted tertiary-alkyl group containing not more than 8 carbon atoms.

5. 1-(4-tertiarybutyl-phenoxy)-propylene- oxide-2,3.

6. 1-(4-tertiary-octyl-phenoxy)-propylene-oxide-2,3.

HAROLD R. SLAGH.
FRANCIS N. ALQUIST.